United States Patent
Piepenbrink et al.

(10) Patent No.: US 6,219,607 B1
(45) Date of Patent: Apr. 17, 2001

(54) METHOD FOR DETERMINING AN INTERSECTION-TORQUE IN A DRIVING LINE OF A VEHICLE WITH AN AUTOMATIC TRANSMISSION

(75) Inventors: Andreas Piepenbrink, Meersburg; Thomas Rossmann, Herrsching, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/360,548

(22) Filed: Jul. 26, 1999

(30) Foreign Application Priority Data

Oct. 13, 1998 (DE) ................................ 198 47 205

(51) Int. Cl.$^7$ .................................................. F16H 59/14
(52) U.S. Cl. .................................................. 701/51; 701/54
(58) Field of Search ................................. 701/51, 54, 67, 701/68; 477/78, 107, 115

(56) References Cited

U.S. PATENT DOCUMENTS

| | | | |
|---|---|---|---|
| 4,700,590 | * 10/1987 | Omitsu | 74/857 |
| 5,674,155 | * 10/1997 | Otto et al. | 477/176 |
| 5,679,091 | * 10/1997 | Salecker et al. | 477/86 |

FOREIGN PATENT DOCUMENTS 195 11 866 A1    10/1996 (DE) .
197 08 528 A1    9/1997 (DE) .

OTHER PUBLICATIONS

"*ATZ Automobiltechnische Zeitschrift*" 94 (1992) by Andreas Welter, Rudolf Kragl, Harald Ender and Harry Martin, pp. 428–438 (month is not available).

* cited by examiner

Primary Examiner—Tan Nguyen
(74) Attorney, Agent, or Firm—Davis & Bujold, P.L.L.C.

(57) ABSTRACT

A method for determining an intersection-torque in a driving line of a motor vehicle having an automatic transmission which is controlled by an electronic control mechanism having one microprocessor with several program modules, the intersection-torque is determined in a program module of the electronic transmission control mechanism and is approximately defined by a state description of uniaxial transmission dynamics with model recalculation. At the same time the numbers of revolutions ($\omega\_1$, $\omega\_2$, $\omega\_{AB}$) measured by sensors and preset inertia moments ($J\_1$, $J\_2$, $J\_{drive}$) are used as state variables for a motor, the transmission and/or the vehicle.

12 Claims, 1 Drawing Sheet

METHOD FOR DETERMINING AN INTERSECTION-TORQUE IN A DRIVING LINE OF A VEHICLE WITH AN AUTOMATIC TRANSMISSION

BACKGROUND OF THE INVENTION

The invention relates to a method for determining an intersection-torque in a driving line of a motor vehicle having an automatic transmission.

Modern automatic transmissions are controlled by an electronic transmission control (EGS) which always communicates with sensors and other control equipment and computers of different units via a CAN (Controller Area Network) databus for the automatic selection of a shift program deposited in the electronic transmission control describing, e.g. an identification of a driver type as disclosed in the publication "ATZ Automobiltechnische Zeitschrift" 94 (1992), an environment related detection, a detection of a driving situation or a detection of a manual engagement and for gear selection dependent on a situation.

When detecting the driving situation, such as uphill drive or downhill, great importance is attached to an accurate evaluation of the driving line dynamics. Intersection-torques, such as motor torque, transmission output torque, or tractional resistance torque constitute important values, since fromthem the electronic transmission control can deduce additional values, such as an angle of the road ahead.

From the practice is known a method for determining a driving line intersection-torque in which a stationary torque is calculated from the product of the speed ratio and the motor torque. A medium value is thus obtained, but thus is very inaccurate.

Another known solution comprises drawing up a mathematical model equation to describe single axle drive line dynamics consisting of the inertias of the shafts and the number of revolutions thereof. Therewith are calculated the intersection-torques, such as the load torque, and derivations are made therefrom, however, the result is ridden with considerable inaccuracies. The parameters derived from a torque thus calculated are accordingly still more imprecise and often no longer utilizable.

Therefore, the known methods deliver sufficiently accurate results only for a static operation such as continuous uphill drive or a gradient over a long period of time with a very steep road angle.

However, a dynamic detection of the intersection-torques of the driving line was not possible.

Another disadvantage of said method is the very high parametering expense on each vehicle, i.e. each motor-transmission combination.

From control techniques are known control methods with a so-called state description with which can be examined systems having several input and output variables. Such state controls are used in working machines when high demands are imposed on dynamic quality control.

States variables carry the information concerning the dynamic characteristic of a controlled system or of a method. The state control makes use of this information by measuring all state variables and restoring them to the input of the control system.

For physical reasons or reasons of cost, individual state variables often cannot be measured wherefore said state variables have to be calculated from measured state variables. This is performed by state monitors which themselves constitute control systems. This presupposes that the controlled system or the transmission system can be observed, i.e. that by measuring the output variables the initial state of the state variables can be determined. Here the input variable must be known and the observation time determined.

To effect the observation, the controlled system forms a mathematical model in the manner of the state equation of the monitor. The section model is connected parallel to the controlled system, the input variable acting upon both systems. The section model is complemented by a control in which the output variables of controlled method and monitor are compared with each other. The difference retroacts on the section model via a monitor vector.

An interference level acting upon the controlled method can also have the meaning of an initial value. Interferences impair the excellence of the state control and of the state observation. But by using interference level monitors, it is also possible to determine and compensate interference levels. For the calculation of the interference level monitor, an interference level model is needed. The interference level, acting upon the controlled method, is to be compensated by means of the monitored interference signal. The remaining control difference is adjusted to zero with the modulation of the interference level.

In control techniques, it has been found that such a state control with interference level monitor has the best quality of control.

The problem on which this invention is based is to make available a method for determining an intersection-torque in a drive line of a motor vehicle having an automatic transmission with which the intersection-torques can be very precisely and dynamically calculated.

According to the invention this problem is solved by a method according to claim 1.

SUMMARY OF THE INVENTION

In the method according to the invention the intersection-torques of the driving line are determined on the basis of the uniaxial dynamics by a sensor measuring the number of revolutions and by model recalculation based on the technology of a state evaluation method which allows taking into account as states unknown input factors or parameters.

With the method, according to the invention, it is advantageously possible, with corresponding quality of recalculation, a very good evaluation of the uniaxial drive line dynamics which without additional adaptation cost delivers reliable values for intersection-torques and factors derived therefrom.

Another advantage of the invention consists in that no additional hardware is required. Only needed is information such as numbers of revolutions and a speed ratio calculated therefrom, also gradients thereof which sensors already available in any case measure, and is available in the transmission control device or computer systems associated therewith. The method, according to the invention, is thus easy to implement as program module of the electronic control mechanism.

Of special advantage is the finding of an intersection-torque from measured numbers of revolutions and predetermined inertia moments with a model recalculation, according to the method of the interference level monitor. In this method, an unknown intersection-torque to be determined is introduced as a state factor and co-evaluated or monitored by control technology.

As an alternative to the state evaluation method with an interference level monitor, the use of an extended Kalman filter where factors to be determined as state factors are introduced and very accurately calculated can also be provided.

In a very advantageous application of the method, according to the invention, a tractional resistance torque from which the lead angle of a road is determined much more accurately than by transitional gradient sensors or by a stationary calculation can be provided to determine as intersection-torque.

BRIEF DESCRIPTION OF THE DRAWINGS

The invention will now be described, by way of example, with reference to the accompanying drawings, in which.

DESCRIPTION OF THE PREFERRED EMBODIMENTS(S)

Figure 1:
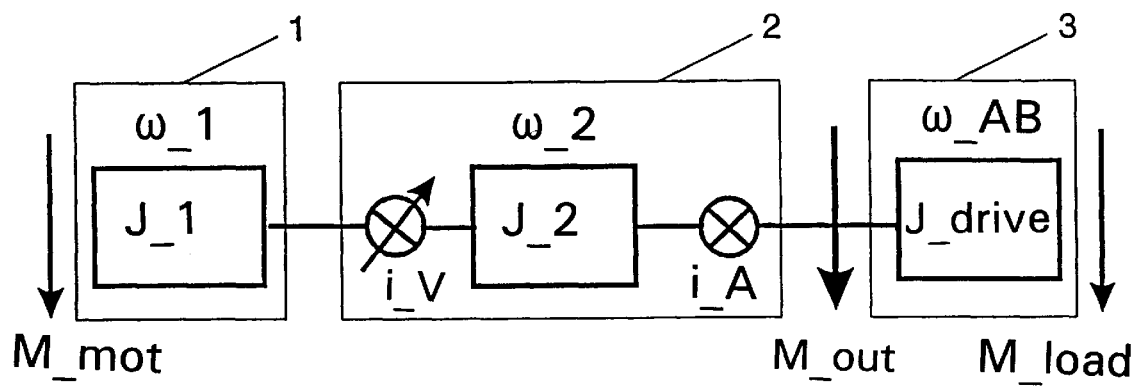
FIG. 1 is an extensively schematized drive line model of an automatic transmission having intersection-torques that can be determined according to the invention.

Referring to FIG. 1, a simple driving line model of a motor vehicle having an automatic transmission is shown.

As a transmission is provided a CVT (continuously variable transmission), not shown in detail, which has a variator with a first cone pulley pair upon an input shaft as a primary disc set and with a second cone pulley pair upon an output shaft as a secondary disc set for continuous control of a reduction ratio $i_{13}$ V between a shortest possible speed ratio and a longest possible speed ratio.

The CVT automatic transmission is controlled by an electronic transmission control mechanism having a microprocessor with several program modules and which always communicates with sensors and computer systems of additional units, e.g. a digital motor electronic system, via a CAN (controller area network) databus.

The electronic transmission control mechanism issues as signal an intersection-torque to be determined of the driving line.

In the driving line model shown in FIG. 1 is symbolically shown a motor-inertia 1 with a motor inertia moment J__1 and a motor number of revolutions ω1, a transmission inertia 2 with a transmission inertia moment J__2, a number of revolutions ω__2 of the output shaft of the variator on the secondary set, an axle speed ratio i__A and the variator speed ratio i__V and a vehicle inertia 3 with a vehicle inertia moment J__drive and an axle number of revolutions ω__AB.

As intersection-torque can be determined by a motor torque M__mot, a transmission output torque M__out or a load torque M__load, which is here a tractional resistance torque.

The intersection-torque to be determined is defined in a program module of the electronic control mechanism on the basis of the uniaxial transmission dynamics by measuring the numbers of revolutions ω__1, ω__2, ω__AB by means of sensors and by model recalculation based on the technology of the interference level monitor.

The interference level monitor is a process of control technology based on a model description in space. The measured numbers of revolutions ω__1, ω__2, ω__AB and the preset inertia moments J__1, J__2, J__drive for the motor, the transmission and the vehicle are used here as state variables.

To process the model described with differential equations, e.g. to simulate the system, input variables are needed wherein the intersection-torque to be determined M__mot, M__out, or M__load is an unknown input variable which has to be calculated.

Figure 2:
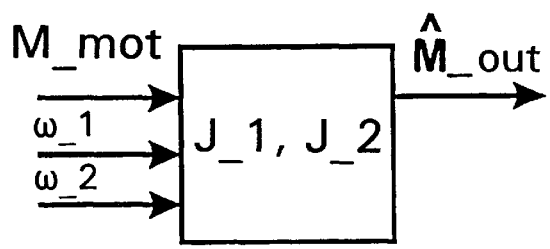
FIG. 2 is a schematic representation of a state evaluation with an interference level motor.

Referring to FIG. 2, the figure diagrammatically shows a state evaluation carried out for this with an interference level monitor, wherein the transmission output torque M__out is determined. The driving line dynamics at the same time is evaluated in a manner such that from the numbers of revolutions ω__1, ω__2 and from the presetting of the inertia moments J__1, J__2 for the motor torque M__mot as known torque delivered by the digital motor electronic system, a value $\hat{M}$__mot as known torque delivered the digital motor electronic system, a value $\hat{M}$__out is evaluated for the transmission output torque M out by interference level monitoring. The speed ratio needed and the gradient thereof are likewise calculated from the measured number of revolutions.

The embodiment shown stands for a "reduced" interference level monitor, i.e. the variables which are measured are not additionally co-evaluated whereby the expense of calculation is reduced.

As alternative to this a "non-reduced" interference level monitor can clearly be used with which is additionally obtained a control of the divergence of the values assessed and therewith an improved reliability.

Figure 3:
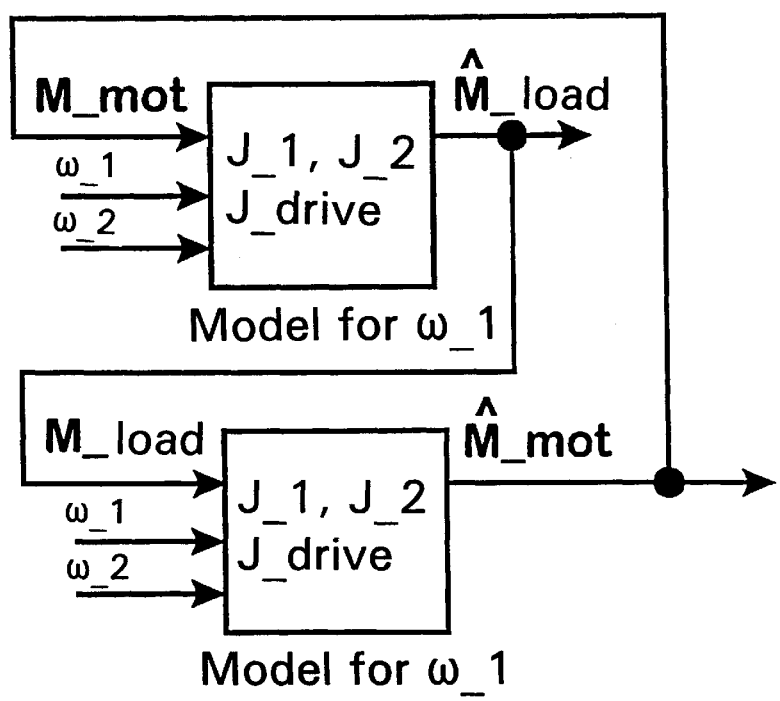
FIG. 3 is a schematic representation of a state evaluation with a multiple application of the method of the interference level monitor.

Referring to FIG. 3, it shows a state evaluation different from the variant shown in FIG. 2 in which an intersection-torque to be determined, in this case the motor torque M__mot, is defined without presetting a different torque.

This is effected by multiple applications of the method of the interference level monitor to linearly independent description equations of the driving line wherein a rated torque $\hat{M}$__load of a first interference monitor enters as input variable M__load in one other interference monitor which then issues an evaluation $\hat{M}$__mot for the motor torque M__mot.

In order to make clear how added values important for the transmission control are obtained from the driving line intersection-torques determined, herebelow is explained the calculation of a lead angle α of a road with the aid of the tractional resistance torque M__load seen in FIG. 1 which controls the vehicle on the road in the presence of a gradient.

The tractional resistance torque M__load is reconstructed from the driving line model seen in FIG. 1 and calculated by the microprocessor of the electronic transmission mechanism according to the function $$\frac{d\omega_{\_1}}{dt}\left(J_{\_1}i_{\_V}\eta + J_{\_2}/i_{\_V} + J_{\_Fahr}\frac{1}{i^2_A\eta_{\_2}i_{\_V}}\right) =$$

$$M_{\_mot}i_{\_V}\eta + \frac{di_{\_V}}{dt}\left(\frac{J_{\_2}}{i^2_V} + \frac{J_{\_FAHR}}{\eta_{\_2}i^2_A i^2_V}\right)\omega_{\_1} - M_{\_Last}\frac{1}{\eta_{\_2}i_{\_A}}$$

with a number of revolutions gradient of the motor shaft dω__1/dt, the inertia moments J__1, J__2, J__drive of the motor, of the transmission and of the vehicle, the speed ratios i__V, i__A of the variator and of the axle, the motor torque M__mot and a degree of effectiveness η__2.

With the tractional resistance torque M__load thereby assessed as input variable can be calculated the lead angle α which is approximately conforms with the equation $$M\_Last = r\_dyn(0.5c_w\rho Av^2 + mg(\sin(\alpha) + \mu\cos(\alpha)))$$

wherein r__dyn is a dynamic tire radius, cw a drag value, A a front face of the vehicle, v a vehicle speed, m a volume of the vehicle and g a gravitational acceleration.

The vehicle speed is therein determined according to the function $$v = \omega\_2 \, i\_A \, 9.55$$

with the number of revolutions of the output shaft of the variator $\omega\_2$ and the axle speed ratio $i\_A$.

By the angular approximation sin $(\alpha)=\alpha$ and cos $(\alpha)=1$, the method thus delivers from the vehicle resistance torque M-load a reliable assessment value for the lead angle $\alpha$, a braking force being omitted.

The speed of the evaluation is basically adjustable by a current process of pole standard for the interference level monitor.

Reference symbols
1 motor inertia
2 transmission inertia
3 vehicle inertia
$i\_A$ axle speed ratio
$i\_V$ speed ratio of variator
$J\_1$ inertia of the motor
$J\_2$ inertia of the transmission
$J\_drive$ inertia of the vehicle
$M\_out$ transmission output torque
$\hat{M}\_out$ evaluated transmission output torque
$M\_load$ load torque, tractional resistance torque
$\hat{M}_{13}$ load evaluated load torque, tractional resistance torque
$M\_mot$ motor torque
$\hat{M}\_mot$ evaluated motor torque
$\omega\_1$ number of revolutions of the motor shaft
$\omega\_2$ number of revolutions of the output shaft of the variator
$\omega\_AB$ number of revolutions of the axle

What is claimed is:

1. A method for dynamically determining an intersection-torque for a drive line of a motor vehicle, the drive line of the motor vehicle having a motor drivingly connected with an uniaxial automatic transmission which is controlled by an electronic transmission mechanism, and the electronic transmission mechanism having a microprocessor with at least one program module for processing information and determining a desired intersection-torque;

the method comprising the steps of:
measuring a rotational speed of at least an output of the motor and an output of the automatic transmission ($\omega\_1$, $\omega\_2$) via sensors;
using preset inertia moments ($J\_1$, $J\_2$, $J\_drive$) for determining the desired intersection-torque via a recalculation model, with the recalculation model utilizing the rotational speed of at least the output of the motor and the output of the automatic transmission ($\omega\_1$, $\omega\_2$) and the preset inertia moments ($J\_1$, $J\_2$, $J\_drive$).

2. The method according to claim 1, further comprising the step of determining the intersection-torque from one of a motor torque ($M\_mot$) of the vehicle, a transmission output torque ($M\_out$) of the vehicle, and a load torque ($M\_load$) of the vehicle.

3. The method according to claim 2, further comprising the step of using an interference level monitor for determining the intersection-torque to be determined.

4. The method according to claim 3, further comprising the step of determining the intersection-torque, via the interference level monitor, by measuring a number of revolutions of the motor ($\omega\_1$), a number of revolutions of an output shaft of the transmission ($\omega\_2$), a number of revolutions of a speed of the vehicle ($\omega\_AB$); and using a predetermined inertia moment of the motor ($J\_1$), a predetermined inertia moment of the transmission ($J\_2$), and a predetermined inertia moment of the output drive axle of the vehicle ($J\_drive$); and using a preset torque value for one of a motor torque ($M\_mot$) of the vehicle, a transmission output torque ($M\_out$) of the vehicle, and a load torque ($M\_load$) of the vehicle.

5. The method according to claim 4, further comprising the step of determining, by a digital motor electronic mechanism, the preset motor torque ($M\_mot$) of the vehicle to be sent to the electronic control device.

6. The method according to claim 3, further comprising the step of calculating the torque to be determined by repeat application of the interference level monitor, and feeding the determined torque ($\hat{M}\_out$, $\hat{M}\_load$, $\hat{M}\_mot$) from the interference level monitor as an input variable to an additional interference level monitor.

7. The method according to claim 1, further comprising the step of using a driving line model for a CVT automatic transmission as the recalculation model, wherein the model for the CVT automatic transmission includes at least the following variables: a transmission inertia (2) having a transmission inertia moment ($J\_2$), a variator speed ratio ($i\_V$), a speed of the vehicle ($\omega\_AB$) and with an axle speed ratio ($i\_A$).

8. The method according to claim 1, further comprising the step of using a Kalman filter for determining the intersection-torque to be determined.

9. The method according to claim 1, further comprising the step of determining the load torque ($M\_load$) of the vehicle as an interference-torque, with the load torque ($M\_load$) of the vehicle representing a tractional resistance torque of the vehicle.

10. The method according to claim 9, further comprising the step of calculating a lead angle ($\alpha$) of a road to be traveled along by the vehicle from the determined tractional resistance torque ($M\_load$).

11. The method according to claim 10, further comprising the step of calculating the tractional resistance torque ($M\_load$) of the vehicle according to the formula:

$$\frac{d\omega\_1}{dt}\left(J\_1 i\_V \eta + J\_2/i\_V + J\_{Fahr}\frac{1}{i^2\_A \eta\_2 i\_V}\right) =$$

$$M\_{mot} i\_V \eta + \frac{di\_V}{dt}\left(\frac{J\_2}{i^2\_V} + \frac{J\_{FAHR}}{\eta\_2 i^2\_A i^2\_V}\right)\omega\_1 - M\_{Last}\frac{1}{\eta\_2 i\_A}$$

with $d\omega\_1/dt$ being a number of revolution gradient of a motor shaft, $J\_1$ being an inertia moment of the motor, $J\_2$ being an inertia moment of the transmission, an $J\_drive$ being an inertia moment of the vehicle, $i\_V$ being a speed ratio of the variator, $\eta$, $\eta\_2$ being a degree of effectiveness, $M\_mot$ being a motor torque and $i\_A$ being an axle speed of rotation; and the lead angle ($\alpha$) is determined with the approximately determined tractional resistance torque ($M\_load$) according to the function:

$$M\_Last = r\_dyn(0.5 c_w \rho A v^2 + mg(\sin(\alpha) + \mu\cos(\alpha)))$$

with $r\_dyn$ being a dynamic tire radius, $c_w$ being an air resistance value, $A$ being a front surface of the vehicle, $v$ being a vehicle speed, $m$ being a volume of the vehicle and $g$ being a gravitational acceleration; and the vehicle speed ($v$) being determined according to the function $$v = \omega\_2 \, i\_A \, 9.55$$

with $\omega\_2$ being a number of revolutions of an output shaft of the variator and $i\_A$ an axle speed ratio.

12. A method for dynamically determining an intersection-torque for a drive line of a motor vehicle, the drive line of the motor vehicle having a motor drivingly connected with an uniaxial automatic transmission which is controlled by an electronic transmission mechanism, and the electronic transmission mechanism having a microprocessor with at least one program module for processing information and determining a desired intersection-torque;

the method comprising the steps of:

measuring an output speed of the motor, an output speed of the automatic transmission and a speed of the vehicle ($\omega\_1$, $\omega\_2$, $\omega\_AB$) via sensors;

using a preset inertia moment of the motor of the vehicle, a preset inertia moment of the transmission of the vehicle, and a preset inertia moment of the vehicle ($J\_1$, $J\_2$, $J\_drive$) for determining the desired intersection-torque via a recalculation model, with the recalculation model utilizing the output speed of the motor, the output speed of the automatic transmission and the speed of the vehicle ($\omega\_1$, $\omega\_2$, $\omega\_AB$) and the preset inertia moment of the motor of the vehicle, the preset inertia moment of the transmission of the vehicle, and the preset inertia moment of the vehicle ($J\_1$, $J\_2$, $J\_drive$).

* * * * *